(No Model.)
F. WICK.
THILL COUPLING.
No. 346,420. Patented July 27, 1886.
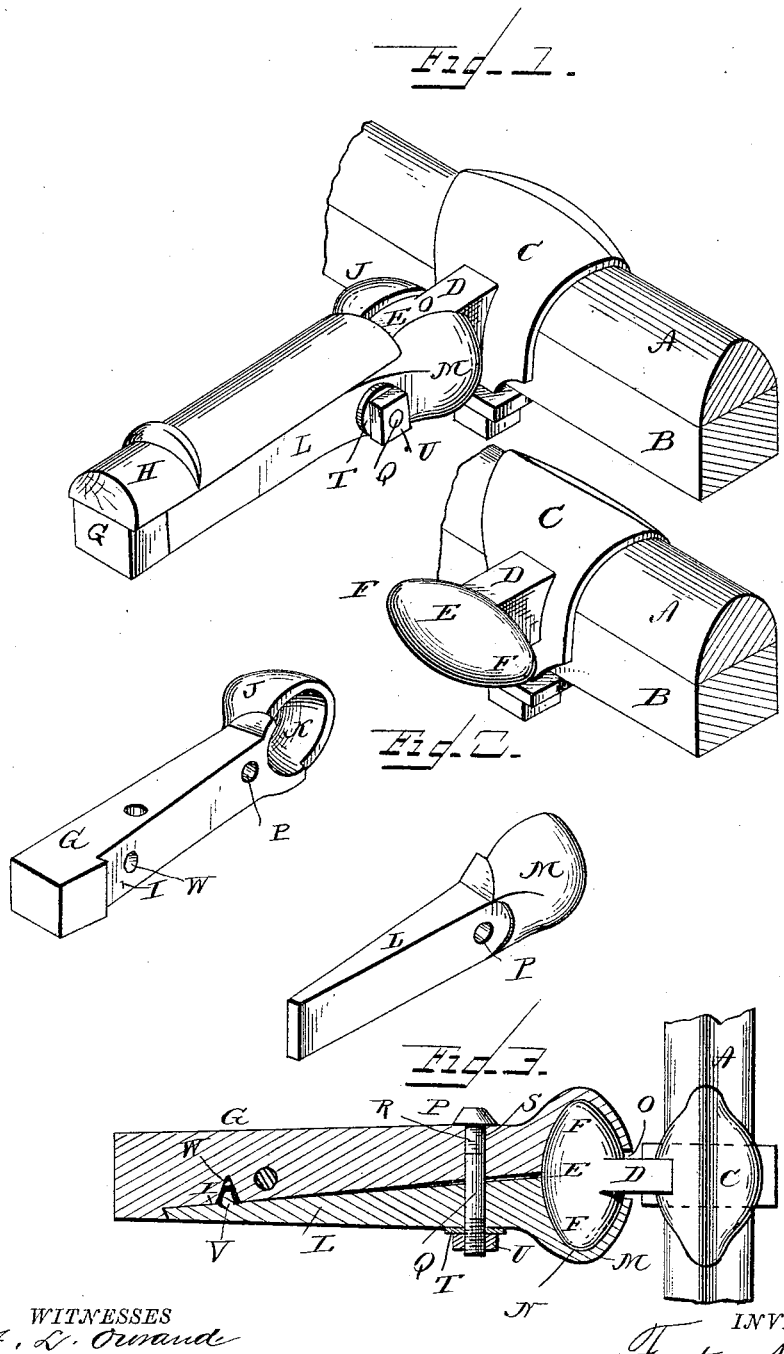
WITNESSES
F. L. Orward
Edward Stanton
INVENTOR
Foster Wick,
By Louis Bagger & Co
Attorneys

UNITED STATES PATENT OFFICE.

FOSTER WICK, OF COULTERSVILLE, PENNSYLVANIA.

THILL-COUPLING.

SPECIFICATION forming part of Letters Patent No. 346,420, dated July 27, 1886.

Application filed May 20, 1886. Serial No. 202,776. (No model.)

*To all whom it may concern:*

Be it known that I, FOSTER WICK, a citizen of the United States, and a resident of Coultersville, in the county of Butler and State of Pennsylvania, have invented certain new and useful Improvements in Thill-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved thill or shaft coupling. Fig. 2 is a similar view of the several portions of the coupling separated; and Fig. 3 is a horizontal sectional view through the joint.

Similar letters of reference indicate corresponding parts in all the figures.

My invention has relation to that class of thill or shaft couplings in which a head having conical ends projects from the clip upon the axle, and is engaged by corresponding bearings at the rear end of the thill or shaft bar; and it consists in the improved construction and combination of parts of such a coupling, as hereinafter more fully described and claimed.

In the accompanying drawings, the letter A indicates the axle-tree, B is the axle, and C is the clip which secures the axle to the axletree. The forward side of this clip is provided with a flat forwardly-projecting neck, D, having a head, E, upon its outer end, consisting of two conical laterally-projecting portions, F F, being preferably slightly rounded toward the apices. The thill-iron G, which is secured to the under side of the thill or shaft bar H, has a forwardly-tapering recess, I, in one side, and the rear end of the said thill iron is formed into a cup-shaped bearing, J, having a conical recess, K, into which one end of the crosshead upon the clip may fit. A wedge-shaped bar, L, fits with its inclined inner side against the inclined side of the recess of the thill-iron, having its outer side flush with the side of the thill-iron, and the rear end of this wedge-shaped bar is formed into a cup-shaped bearing, M, shaped similar to the bearing at the end of the thill-iron, and fitting with its conical recess N upon the other end of the crosshead of the clip. The inner sides or ends of the conical bearings are cut away, so as to form a slot, O, when the bearings are fitted upon the cross-head, allowing the bearings to rock freely upon the cross-head, having the neck projecting through the slot, and having the bearings sliding with the said slot upon the neck. The wedge-shaped bar and the thill-iron are formed with a transverse perforation, P, through which a bolt, Q, is inserted, the end of the perforation in the thill-iron having a square outer portion, R, in which the square neck S of the bolt fits, while the screw-threaded end of the bolt passes out through the perforation in the wedge-shaped bar, and is provided with a washer, T, and a nut, U, by means of which the bar may be drawn toward the thill-iron, drawing the bearings together. The tapering forward end of the wedge-shaped bar is provided with an inwardly-projecting pin, V, upon the inclined inner side, which pin fits into a registering perforation or recess, W, in the inclined side of the thill-iron, so that the forward end of the wedge-shaped bar may be held in place and the bar prevented from being tilted upon the bolt. The inner side of the wedge-shaped bar and the inner inclined side of the recess in the thill-iron do not bear against each other when the coupling is first put in use, but will have a sufficient space between the inner sides, so that the bolt may have its nut tightened, as the conical ends of the cross-head and the recesses in the bearings wear out, drawing the said bearings toward each other upon the conical ends of the head, causing them to take up all wear. In this manner all rattling of the coupling may be prevented, and the coupling may at all times be perfectly tight and in perfect fit.

The thills or shafts of vehicles may be removed and inserted with this coupling in a moment of time by simply removing the nut and washer from the bolt holding the two halves of the bearings, when the wedge-shaped bar may be removed and the thill or shaft removed, and in replacing it the wedge-shaped bar may be put in place and fastened by the bolt and nut in a moment of time.

By the nature of the ends of the head and of the correspondingly-shaped bearings or recesses the parts of the coupling will at all times wear themselves into a fit, the conical ends being at all times centered in the bearings, it being impossible for the head to wear irregularly within the bearings if the bearings are kept screwed tightly toward the ends of the head and toward each other.

Having thus described my invention, I claim and desire to secure by Letters Patent of the United States—

In a thill or shaft coupling, the combination of a clip upon the axle having a forwardly-projecting flat neck provided with a cross-head having conical rounded ends, a thill-iron having a forwardly-tapering recess in its inner side, and having a perforation in the inner inclined side at the forward end, and a transverse perforation near the rear end, and having the rear end formed with a bearing or cup fitting upon one end of the cross-head corresponding in shape of its recess to the said end, and having the inner side of the bearing slightly cut away, a wedge-shaped bar having a pin upon the forward end of its inner inclined side and a transverse perforation near its rear end, and formed with a cup or bearing having its inner side slightly cut away and fitting upon the other end of the cross head, and a bolt passing through the registering perforations and having a washer and a nut, as and for the purpose shown and set forth.

In testimony that I claim the foregoing as my own I have hereunto affixed my signature in presence of two witnesses.

FOSTER WICK.

Witnesses:
I. N. McKINNEY,
LEWIS WOLFORD.